United States Patent Office 3,679,664
Patented July 25, 1972

3,679,664
3-AZA-A-HOMO-STEROIDS

Arvin Pranlal Shroff, Somerville, N.J., assignor to Ortho Pharmaceutical Corporation
No Drawing. Original application June 18, 1965, Ser. No. 465,175. Divided and this application Jan. 14, 1970, Ser. No. 7,326
The portion of the term of the patent subsequent to July 15, 1986, has been disclaimed
Int. Cl. C07c *169/36*; C07d *101/00*
U.S. Cl. 260—239.3 P    4 Claims

ABSTRACT OF THE DISCLOSURE

Compounds of the formula:

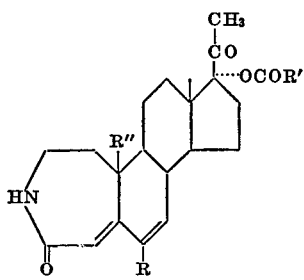

wherein R is hydrogen, methyl, ethyl, chlorine, bromine or fluorine, R' is hydrogen or alkyl from 1 to 11 carbon atoms and R" is hydrogen or methyl, are potent progestational agents and possess anti-ovulatory activity.

---

This is a division of application Ser. No. 465,175 filed June 18, 1965, now abandoned.

The present invention relates to steroidal 3-oximes and 3-aza-A-homo steroids. Specifically, the new compounds may be represented by the following structural formulae:

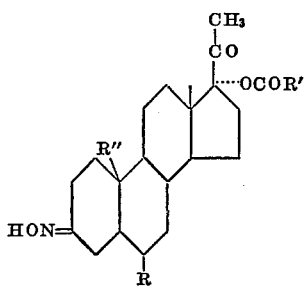

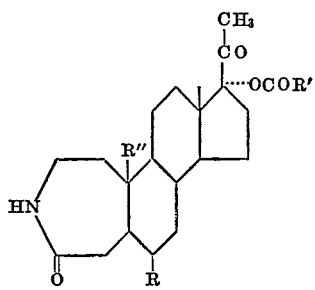

wherein R is hydrogen, methyl, ethyl, chlorine, bromine or fluorine, R' is hydrogen or alkyl from 1 to 11 carbon atoms and R" is hydrogen or methyl.

The 3-oximes and 3-aza compounds of the present invention are potent progestational agents and more particularly possess anti-ovulatory activity.

Steroidal oximes can conventionally be prepared by reaction of a carbonyl group on the steroid with a hydroxylamine salt in the presence of a base such as pyridine, sodium hydroxide or sodium acetate.

When a steroid having a carbonyl group at the 3- and 20-positions is subjected to treatment with a hydroxylamine salt under basic conditions, the dioxine would be the expected product. Due to the presence of a 17-ester group in the starting compounds from which the oximes of this invention are prepared, steric hindrance prevents the oximation of the 20-carbonyl. The 17-ester can be readily converted to the alcohol by hydrolysis.

The oxime is subjected to Beckmann rearrangement in the presence of an acidic reagent to form the corresponding 3-aza-A-homo steroid. Typical acidic reagents which may be used are thionyl chloride, polyphosphoric acid, p-toluenesulfonyl chloride, p-acetylaminobenzene-sulfonyl chloride, p-aminobenzenesulfonyl chloride and phosphorus pentachloride.

As starting materials for the preparation of the oximes there are used compounds of the structural formula

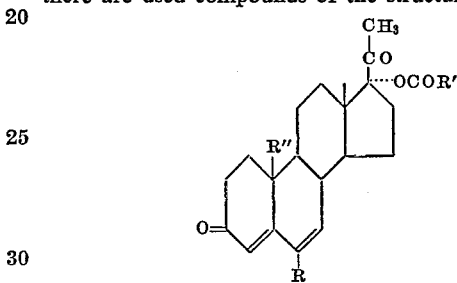

wherein R is hydrogen, methyl, ethyl, chlorine, bromine or fluorine, R' is alkyl from 1 to 11 carbon atoms, and R" is hydrogen or methyl.

The following examples illustrate the invention:

EXAMPLE I

17α-acetoxypregn-4,6-diene-3,20-dione 3-oxime

17α-acetoxy-6-dehydro-progesterone (4.5 g.) is treated with 30 ml. of methanol, 2.0 ml. of pyridine and 1.0 g. of hydroxylamine hydrochloride. The mixture is heated on a steam-bath for one-half hour and allowed to cool. The precipitates are filtered and recrystallized from methanol to give 17α-acetoxypregn-4,6-diene-3,20-dione 3-oxime, M.P. 247–250°.

*Analysis.*—Calculated for $C_{23}H_{31}NO_4$ (percent): C, 71.66; H, 8.11; N, 3.63. Found (percent): C, 71.79; H, 8.33; N, 3.36.

EXAMPLE II 6-chloro-17α-acetoxypregn-4,6-diene-3,20-dione 3-oxime

One and a half gram of 6-chloro-17α-acetoxypregn-4,6-diene-3,20-dione is treated with 25 ml. of methanol, 500 mg. of hydroxylamine hydrochloride and 500 mg. of sodium acetate. The mixture is heated on a steam bath for one-half hour and allowed to cool. The crystals are filtered and recrystallized from methanol to give 6-chloro-17α - acetoxypregn - 4,6 - diene - 3,20 - dione 3-oxime, M.P. 166–168°.

*Analysis.*—Calculated for $C_{23}H_{30}NO_4Cl$ (percent): C, 65.79; H, 7.20; N, 3.34. Found (percent): C, 65.65; H, 7.33; N, 3.33.

EXAMPLE III 6-methyl-17α-acetoxypregn-4,6-diene-3,20-dione 3-oxime

One gram of 6-methyl-17α-acetoxypregn-4,6-diene-3,20-dione is dissolved in 15 ml. of pyridine containing 250 mg. of hydroxylamine hydrochloride. The flask is heated on a steam-bath for one-half hour and poured over a large excess of ice-water. The solid material is collected by filtration and recrystallized from methanol to give 6- methyl - 17α - acetoxypregn - 4,6 - diene - 3,20 - dione 3-oxime, M.P. 225–227°.

*Analysis.*—Calculated for $C_{24}H_{33}NO_4$: (percent) C, 72.15; H, 8.33; W, 3.51. Found (percent): C, 72.40; H, 8.40; N, 3.58.

Following the procedure of Examples I to III, the following related compounds are prepared starting from the appropriate ketone:

6-ethyl-17α-acetoxypregn-4,6-diene-3,20-dione 3-oxime,
19-nor-6-ethyl-17α-acetoxypregn-4,6-diene-3,20-dione 3 oxime,
19-nor-17α-acetoxypregn-4,6-diene-3,20-dione 3-oxime,
19-nor-6-chloro-17α-acetoxypregn-4,6-diene-3,20-dione 3-oxime,
19-nor-6-methyl-17α-acetoxypregn-4,6-diene-3,20-dione 3-oxime,
6-ethyl-17α-acetoxypregn-4,6-diene-3,20-dione 3-oxime,
19-nor-6-fluoro-17α-caproxypregn-4,6-diene-3,20-dione 3-oxime,
17α-undecyloxypregn-4,6-diene-3,20-dione 3-oxime,
19-nor-17α-undecyloxypregn-4,6-diene-3,20-dione 3-oxime,
6-methyl-17α-undecyloxypregn-4,6-diene-3,20-dione 3-oxime, and
19-nor-6-methyl-17α-undecyloxypregn-4,6-diene-3,20-dione 3 oxime.

EXAMPLE IV 3-aza-17α-acetoxy-A-homopregn-4a,6-diene-4,20-dione

17α - acetoxypregn-4,6-diene-3,20-dione 3-oxime (1.2 g.) is treated with 10 ml. of dioxane and 1.0 ml. of thionyl chloride. The mixture is stirred for one and one-half hours and poured over ice-water. The solid material is extracted with ethyl acetate. The organic layer is washed with water until neutral to litmus, dried over sodium sulfate and evaporated. The semi-solid residue is recrystallized from acetone-hexane to give 3-aza-17α-acetoxy-A-homopregn-4a-6-diene, -4,20-dione, M.P. 206–210°.

*Analysis.*—Calculated for $C_{23}H_{31}NO_4$ (percent): C, 71.66; H, 8.11; N, 3.63. Found (percent): C, 71.43; H, 8.20; N, 3.81.

EXAMPLE V 3-aza-6-chloro-17α-acetoxy-A-homopregn-4a,6-diene-4,20-dione

One gram of 6-chloro-17α-acetoxypregn-4,6-diene-3,20-dione 3-oxime is treated with 5.7 g. of polyphosphoric acid and maintained between 50–60° for one hour. The mixture is recomposed with ice-water and extracted with methylene chloride. The organic layer is further washed with water until neutral to litmus, dried over sodium sulfate and evaporated. The brown residue is crystallised from hexane-benzene followed by recrystallization from acetone-hexane to give 3-aza-6-chloro-17α-acetoxy-A-homopregn-4a,6-diene-4,20-dione, M.P. 140–142°.

*Analysis.*—Calculated for $C_{23}H_{30}NO_4Cl$ (percent): C, 65.79; H, 7.20; N, 3.34. Found (percent): C, 65.55; H, 7.42; N, 3.46.

EXAMPLE VI 3-aza-6-methyl-17α-acetoxy-A-homopregn-4a,6-diene-4,20-dione

One gram of 6-methyl-17α-acetoxypregn-4,6-diene-3,20-dione 3-oxime is dissolved in 20 ml. of dioxane and treated with 0.7 ml. of thionyl chloride. The mixture is stirred for 2 hours and decomposed with a large amount of ice-water. It is extracted with methylene chloride and the organic layer is washed with potassium bicarbonate solution followed by water until neutral to litmus. It is dried over sodium sulfate and evaporated to give a semi-solid which is recrystallized from benzene-hexane to give 3-aza-6 - methyl-17α-acetoxy-A-homopregn - 4a,6 - diene-4,20-dione, M.P. 138–140°.

*Analysis.*—Calculated for $C_{24}H_{33}NO_4$ (percent): C, 72.15; H, 8.33; N, 3.51. Found (percent): C, 71.62; H, 8.53; N, 3.19.

Following the procedure of Examples IV to VI, the following related compounds are prepared starting from the appropriate 3-oxime:

3-aza-6-ethyl-17α-acetoxy-A-homopregn-4a,6-diene-4,20-dione,
3-aza-19-nor-6-ethyl-17α-acetoxy-A-homopregn-4a,6-diene-4,20-dione,
3 - aza - 19 - nor-17α-acetoxy-A-homopregn-4α,6-diene-4,20-dione,
3-aza-19-nor-6-chloro-17α-acetoxy-A-homopregn-4a,6-diene-4,20-dione,
3-aza-19-nor-6-methyl-17α-acetoxy-A-homopregn-4a,6-diene-4,20-dione,
3-aza-6-fluoro-17α-caproxy-A-homopregn-4a,6-diene-4,20-dione,
3-aza-19-nor-6-fluoro-17α-caproxy-A-homopregn-4a,6-diene-4,20-dione,
3-aza-17α-undecyloxy-A-homopren-4a,6-diene-4,20-dione,
3-aza-19-nor-17α-undecyloxy-A-homopregn-4a,6-diene-4,20-dione,
3-aza-6-methyl-17α-undecyloxy-A-homopregn-4a,6-diene-4,20-dione, and
3-aza-19-nor-6-methyl-17α-undecyloxy-A-homopregn-4a,6-diene-4,20-dione.

What is claimed is:
1. A compound of the formula

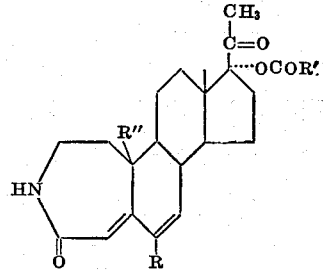

wherein R is selected from the group consisting of hydrogen, methyl, ethyl, chlorine, bromine and fluorine, R' is selected from the group consisting of hydrogen and alkyl of from 1 to 11 carbon atoms and R'' is selected from the group consisting of hydrogen and methyl.

2. 3-aza - 17α - acetoxy-A-homopregn-4a,6-diene-4,20-dione.

3. 3-aza - -6α - methyl-17α-acetoxy-A-homopregn-4a,6-diene-4,20-dione.

4. 3 - aza - 6 - chloro-17α-acetoxy-A-homopregn-4a,6-diene-4,20-dione.

References Cited

UNITED STATES PATENTS 3,138,589   6/1964   Ringold _____ 260—239.55
3,455,903   7/1969   Shroff _____ 260—239.3

OTHER REFERENCES

Ellis et al.: "J. Chem. Soc." (1960), pp. 2828–2833.
Shoppee et al.: "J. Chem. Soc. (1961), pp. 3641–3645.

HENRY R. JILES, Primary Examiner

R. I. BOND, Assistant Examiner

U.S. Cl. X.R.

260—397.4; 424—244, 238

PO-1050
(5/69)

UNITED STATES PATENT OFFICE
CERTIFICATE OF CORRECTION

Patent No. 3,679,664          Dated July 25, 1972

Inventor(s) Arvin P. Shroff

It is certified that error appears in the above-identified patent and that said Letters Patent are hereby corrected as shown below:

In Column 3, line 18, "6-ethyl-17a-acetoxypregn-4," should read --- 6-fluoro-17a-caproxypregn-4 ---.

In Column 3, line 49, "is recomposed" should read --- is decomposed ---.

Signed and sealed this 13th day of February 1973.

(SEAL)
Attest:

EDWARD M. FLETCHER, JR.
Attesting Officer

ROBERT GOTTSCHALK
Commissioner of Patents